United States Patent Office 3,828,063
Patented Aug. 6, 1974

3,828,063
BENZISOXAZOLO(THIONO)PHOSPHORIC
(PHOSPHONIC) ACID ESTERS
Walter Lorenz, Wuppertal-Cronenberg, Horst Böshagen, Haan, Rhineland, and Ingeborg Hammann and Wolfgang Behrenz, Cologne, Germany, assignors to Bayer Aktiengesellschaft, Leverkusen, Germany
No Drawing. Filed June 9, 1971, Ser. No. 151,515
Claims priority, application Germany, June 26, 1970, P 20 31 750.4
Int. Cl. C07d 85/48
U.S. Cl. 260—307 D        2 Claims

ABSTRACT OF THE DISCLOSURE

Benzisoxazolo(thiono)phosphoric(phosphonic) acid esters of the general formula

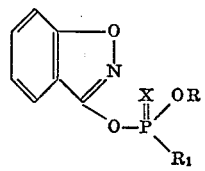

in which
R is a lower alkyl radical,
$R_1$ is a lower alkyl or alkoxy radical, and
X is an oxygen or sulfur atom,
which possess insecticidal, acaricidal, nematocidal and, in some cases, fungicidal properties.

The present invention relates to and has for its objects the provision of particular new benzisoxazolo(thiono)phosphoric(phosphonic) acid esters, which possess insecticidal, acaricidal, nematocidal and fungicidal properties, active compositions in the form of mixtures of such compounds with solid and liquid dispersible carrier vehicles, and methods for producing such compounds and for using such compounds in a new way especially for combating pests, e.g. insects, acarids, nematodes and fungi, especially insects, acarids and nematodes, with other and further objects becoming apparent from a study of the within specification and accompanying examples.

From German Published Specification 1,253,713 it is known that halogen-substituted benzisoxazolothionophosphoric (phosphonic) acid esters, such as O,O-dimethyl- or diethyl - O - [5-chlorobenzisoxazol(3)yl]-thionophosphoric acid ester, exhibit an insecticidal activity.

The present invention provides, as new compounds, the benzisoxazolo(thiono)phosphoric(phosphonic) acid esters of the general formula

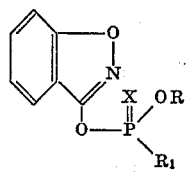

in which
R is a lower alkyl radical,
$R_1$ is a lower alkyl or alkoxy radical, and
X is an oxygen or sulfur atom.

The compounds of the present invention show strong insecticidal, acaricidal, nematocidal, and, in some cases, fungicidal, properties.

The present invention also provides a process for the preparation of a benzisoxazolo(thiono)phosphoric(phosphonic) acid ester of the formula (I) in which 3-hydroxy-1,2-benzisoxazole of the formula

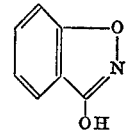

is reacted, in the presence of an acid-acceptor or in the form of an appropriate alkali metal salt, alkaline earth metal salt or ammonium salt, with a (thiono)phosphoric (phosphonic) acid ester halide of the general formula

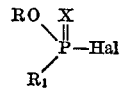

in which
R, $R_1$ and X possess the meaning stated above, and Hal is a halogen atom.

Surprisingly, the benzisoxazole(thiono)phosphoric(phosphonic) acid esters according to the invention show a considerably higher insecticidal and acaricidal activity than the known halogen-substitued benzisoxazolo(thiono) phosphoric acid esters which are the chemically most closely comparable active compounds of the same direction of activity. The substances according to the invention therefore represent a genuine enrichment of the art.

If 3-hydroxy-1,2-benzisoxazole and O,O-diethylthionophosphoric acid ester chloride are used as starting materials, the reaction course can be represented by the following equation:

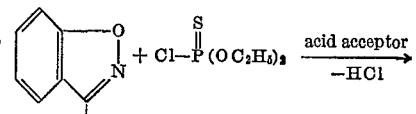

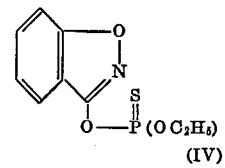

Advantageously the alkyl or alkoxy groups of R and $R_1$ contain 1 to 4 carbon atoms and, preferably, R is methyl or ethyl and $R_1$ is methyl, ethyl, methoxy or ethoxy; Hal is preferably a chlorine atom.

As examples of (thiono)phosphoric(phosphonic) acid ester halides (III) which can be used, there may be mentioned: O,O-dimethyl-, O,O-diethyl-, O,O-diisopropyl-, O-methyl-O-ethyl-, O-ethyl-O-isopropyl- and O-methyl-O-isopropyl-phosphoric acid ester halides and their thiono analogues; further, O,P-dimethyl-, O,P-diethyl-, O,P-diisopropyl, O-methyl-P-ethyl-, O-methyl-P-isopropyl-, O-isopropyl-P-ethyl- and O-isopropyl-P-methyl-phosphonic acid ester halides and their thiono analogues.

The (thiono)phosphoric(phosphonic) acid ester halides as well as the 3-hydroxybenzisoxazole to be used as starting materials can be prepared according to known processes.

The reaction may be carried out in a solvent or diluent; practically all inert organic solvents are suitable. Preferred solvents are aliphatic and aromatic optionally chlorinated hydrocarbons, such as benzene, toluene, xylenes, benzine, methylene chloride chloroform, carbon tetrachloride and chlorobenzene; ethers, such as diethyl ether, dibutyl ether and dioxane; ketones, such as acetone, methylethyl ketone, methylisopropyl ketone and methylisobutyl ketone; and nitriles, such as acetonitrile.

As acid-acceptors, all customary acid-binding agents are suitable. Especially suitable are alkali metal carbonates and alcoholates, such as sodium or potassium carbonate and sodium or potassium methylate or ethylate; furthermore, aliphatic, aromatic or heterocyclic amines, for example triethylamine, dimethylamine, dimethylaniline, dimethylbenzylamine or pyridine, may be used.

The reaction temperatures can be varied within a fairly wide range. In general, the reactants are mixed at about 0° to 50° C., preferably at about 30° to 35° C. and the mixture is afterwards stirred at about 50° to 120° C., preferably at about 70° to 80° C.

The reaction is, in general, carried out at normal pressure.

When carrying out the process, the starting materials are, in most cases, reacted in equimolar amounts in one of the above-mentioned solvents at elevated temperatures. An excess of one or other of the reactants brings no substantial advantages. The heterocyclic reactant can also be used in the form of its alkali metal salts, alkaline earth metal salts or ammonium salt, as already mentioned. The reaction solution is in most cases afterwards stirred for some hours at elevated temperatures, taken up in benzene and worked up as usual.

The esters according to the invention are obtained in most cases in the form of colorless to slightly yellow-colored, viscous, water-insoluble oils which cannot be distilled without decomposition but can, by so-called "slight distillation," that is by prolonged heating to moderately elevated temperatures under reduced pressure, be freed from the last volatile components and in this way be purified. For their characterization, the refractive index is especially useful.

The new compounds according to the invention are distinguished by outstanding nematocidal, insecticidal and acaricidal properties. They are effective against both sucking and biting insects, Diptera, mites, as well as a systemic activity. Additionally, some of them also show fungitoxic effectiveness against phytopathogenic fungi. The products may therefore be used with success in crop protection and in the protection of stored products, as well as in the hygiene field, against the most diverse animal pests.

To the sucking insects contemplated herein there belong, in the main, aphids (*Aphidae*) such as the green peach aphid (*Myzus persicae*), the bean aphid ( *Doralis fabae*), the bird cherry aphid (*Rhopalosiphum padi*), the pea aphid (*Macrosiphum psi*) and the potato aphid (*Macrosiphum solanifolii*), the current gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further cicadas, such as *Euscelis bilobatus* and *Nephotettix bipunctatus*; and the like.

In the case of the biting insects contemplated herein, above all there should be mentioned butterfly caterpillars (*Lepidoptera*) such as the diamond-back moth (*Plutella maculipennis*), the gpysy moth (*Lymantria dispar*), the brown-tail moth (*Euproctis chrysorrhoea*) and tent caterpillar (*Malacosoma neustria*); further the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponoemuta padella*), the Mediterranean flour moth (*Galleria mellonella*); and the like.

Also to be classed with the biting insects contemplated herein are beetles (*Coleoptera*), for example the granary weevil (*Sitophilus granarius=Calandra granaria*), the Colorado beetle (*Leptinostarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelide obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the sawtoothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia madeirae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (*Acari*) contemplated herein there are classed, in particular, the spider mites (*Tetranychidae*) such as the two-spotted spider mite (*Tetranychus telarius=Tetranychus althaeae* or *Tetranychus urticae*) and the European red mite (*Paratetranychus pilosus=Panonychus ulmi*), gall mites, for example the black current gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorous moubata*); and the like.

When applied against hygiene pests harmful to health and to stored products, particularly flies and mosquitoes, the novel products are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicle such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides, fungicides, bactericides and nematocides, or rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids, nematodes and fungi and more particularly methods of combating at least one of insects, acarids and nematodes which comprises applying to at least one of correspondingly (a) such insects, (b) such acarids, (c) such nematodes, (d) such fungi, and (e) the corresponding habitat thereof, i.e. the locus to be protected, a correspondingly combative or toxic amount, i.e. an insecticidally, acaricidally, nematocidally or fungicidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Ceratitis test

Solvent: 3 parts by weight acetone
Emulsifier: 1 part by weight alkylaryl polyglycol ether.

To produce a suitable preparation of active compound, 1 part by weight of the active compound is mixed with the stated amount of solvent containing the stated amount of emulsifier, and the concentrate is diluted with water to the desired concentration.

2 cc. of the preparation of the active compound are pipetted on to a filter paper disc of about 10 cm. diameter. This is placed on a glass in which there are about 30 fruit flies (*Ceratitis capitata*) and covered with a glass plate.

After the specified periods of time, the destruction is determined as a percentage. 100% means that all the flies were killed; 0% means that none of the flies were killed.

The active compounds, the concentrations of the active compounds the evaluation times and the results can be seen from Table 1.

TABLE 1
(Ceratitis test)

| Active compounds | Concentration of active compound in percent | Degree of destruction in percent after 1 day |
|---|---|---|
| A 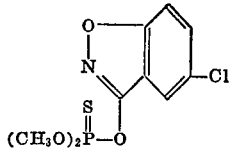 (known) | 0.02<br>0.004<br>0.0008 | 100<br>100<br>30 |
| (B) 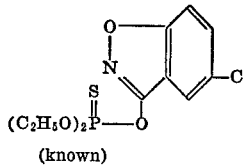 (known) | 0.02<br>0.004<br>0.0008 | 100<br>95<br>50 |
| (C) 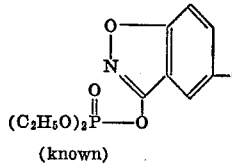 (known) | 0.02<br>0.004<br>0.0008 | 100<br>65<br>0 |

TABLE 1—Continued

| Active compounds | Concentration of active compound in percent | Degree of destruction in percent after 1 day |
|---|---|---|
| (2) 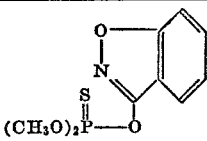 | 0.02<br>0.004<br>0.0008 | 100<br>100<br>100 |
| (1) 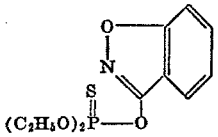 | 0.02<br>0.004<br>0.0008<br>0.00016 | 100<br>100<br>100<br>25 |

EXAMPLE 2

Plutella test

Solvent: 3 parts by weight acetone
Emulsifier: 1 part by weight alkylaryl polyglycol ether.

To product a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*).

After the specified periods of time, the degree of destruction is determined as a percentage: 100% means that all the caterpillars are killed whereas 0% means that none of the caterpillars are killed.

The active compounds, the concentrations of the active campounds, the evaluation times and the results can be seen from Table 2:

TABLE 2
(Plutella test)

| Active compounds | Concentration of active compound in percent | Degree of destruction in percent after 3 days |
|---|---|---|
| C) 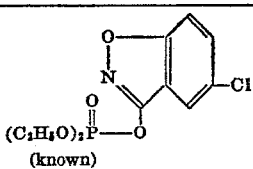 (known) | 0.004<br>0.0008 | 100<br>0 |
| (A) 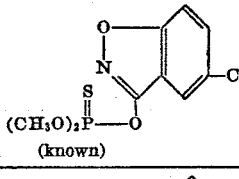 (known) | 0.004<br>0.008 | 100<br>46 |
| (1) 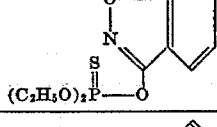 | 0.004<br>0.0008<br>0.00016 | 100<br>100<br>60 |
| (3) 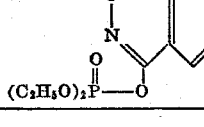 | 0.004<br>0.0008 | 100<br>70 |

EXAMPLE 3

Piesma test

Solvent: 3 parts by weight acetone
Emulsifier: 1 part by weight alkylarylpolyglycol ether.

To produce a suitable preparation of active compound, 1 part by weight of the active compound is mixed with the stated amount of solvent containing the stated amount of emulsifier, and the concentrate is diluted with water to the desired concentration.

Beet leaves (*Beta vulgaris*) are sprayed with the preparation of the active compound until dripping wet and are then infested with beet leaf bugs (*Piesma quadrata*).

After the specified period of time, the degree of destruction is determined as a percentage. 100% means that all the beet leaf bugs were killed. 0% means that none of the beet leaf bugs were killed.

The active compounds, the concentrations of the active compounds, the evaluation time and the results can be seen from the following Table 3:

TABLE 3
(Piesma test)

| Active compounds | Concentration of active compound in percent | Degree of destruction in percent after 3 days |
|---|---|---|
| (B) 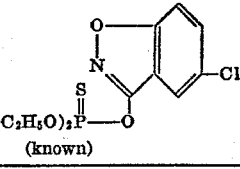 (known) | 0.004<br>0.0008 | 100<br>20 |
| (1) 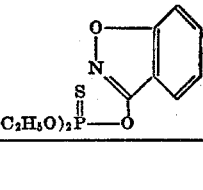 | 0.004<br>0.0008 | 100<br>70 |

EXAMPLE 4

Euscelis test

Solvent: 3 parts by weight acetone
Emulsifier: 1 part by weight alkylarylpolyglycol ether.

To produce a suitable preparation of active compound, 1 part by weight of the active compound is mixed with the stated amount of solvent containing the stated amount of emulsifier and the concentrate is diluted with water to the desired concentration.

Broad bean plants (*Vicia faba*) are sprayed with the preparation of the active compound until dew moist and are then infested with cicadas (*Euscelis bilobatus*).

After the specified period of time, the degree of destruction is determined as a percentage. 100% means that all the cicadas were killed whereas 0% means that none of the cicadas were killed.

The active compounds, the concentrations of the active compounds, the evaluation time and the results can be seen from the following Table 4:

The active compounds, the concentrations of the active compounds, the evaluation time and the results can be seen from the following Table 5:

TABLE 4
(Euscelis test)

| Active compounds | Concentration of compound in percent | Degree of destruction in percent after 3 days |
|---|---|---|
| (A)... $(CH_3O)_2\overset{S}{\overset{\|}{P}}-O-\underset{N}{\overset{O}{\diagdown}}\diagup C_6H_3-Cl$ (known) | 0.1<br>0.02 | 100<br>60 |
| (C)... $(C_2H_5O)_2\overset{S}{\overset{\|}{P}}-O-\underset{N}{\overset{O}{\diagdown}}\diagup C_6H_3-Cl$ (known) | 0.1<br>0.02 | 100<br>50 |
| (2).... $(CH_3O)_2\overset{S}{\overset{\|}{P}}-O-\underset{N}{\overset{O}{\diagdown}}\diagup C_6H_4$ | 0.1<br>0.02<br>0.004 | 100<br>100<br>60 |
| (1).... $(C_2H_5O)_2\overset{S}{\overset{\|}{P}}-O-\underset{N}{\overset{O}{\diagdown}}\diagup C_6H_4$ | 0.1<br>0.02<br>0.004<br>0.0008 | 100<br>100<br>100<br>100 |
| (3).... $(C_2H_5O)_2\overset{O}{\overset{\|}{P}}-O-\underset{N}{\overset{O}{\diagdown}}\diagup C_6H_4$ | 0.1<br>0.02<br>0.004 | 100<br>100<br>100 |
| (4).... $\underset{C_2H_5O}{\overset{C_2H_5}{\diagdown}}\overset{S}{\overset{\|}{P}}-O-\underset{N}{\overset{O}{\diagdown}}\diagup C_6H_4$ | 0.1<br>0.02<br>0.004 | 100<br>100<br>100 |

TABLE 5
(Doralis test/systemic action)

| Active compounds | Concentration of active compound in percent | Degree of destruction in percent after 3 days |
|---|---|---|
| (A)... $(CH_3O)_2\overset{S}{\overset{\|}{P}}-O-\underset{N}{\overset{O}{\diagdown}}\diagup C_6H_3-Cl$ (known) | 0,1 | 0 |
| (B)... $(C_2H_5O)_2\overset{S}{\overset{\|}{P}}-O-\underset{N}{\overset{O}{\diagdown}}\diagup C_6H_3-Cl$ (known) | 0,1 | 20 |
| (2).... $(CH_3O)_2\overset{S}{\overset{\|}{P}}-O-\underset{N}{\overset{O}{\diagdown}}\diagup C_6H_4$ | 0,1 | 100<br>90 |
| (1).... $(C_2H_5O)_2\overset{S}{\overset{\|}{P}}-O-\underset{N}{\overset{O}{\diagdown}}\diagup C_6H_4$ | 0,1 | 90 |
| (3).... $(C_2H_5O)_2\overset{O}{\overset{\|}{P}}-O-\underset{N}{\overset{O}{\diagdown}}\diagup C_6H_4$ | 0,1 | 80 |
| (4).... $\underset{C_2H_5O}{\overset{C_2H_5}{\diagdown}}\overset{S}{\overset{\|}{P}}-O-\underset{N}{\overset{O}{\diagdown}}\diagup C_6H_4$ | 0,1<br>0,02 | 98<br>40 |

EXAMPLE 5

Doralis test (systemic action)

Solvent: 3 parts by weight acetone
Emulsifier: 1 part by weight alkylarylpolyglycol ether.

To produce a suitable preparation of active compound, 1 part by weight of the active compound is mixed with the stated amount of solvent containing the stated amount of emulsifier, and the concentrate is diluted with water to the desired concentration.

Bean plants (*Vicia faba*) which have been heavily infested with the beam aphid (*Doralis fabae*) are watered with the preparation of the active compound so that the preparation of active compound penetrates into the soil without wetting the leaves of the bean plants. The active compound is taken up by the bean plants from the soil and thus reaches the infested leaves.

After the specified period of time, the degree of destruction is determined as a percentage. 100% means that all the aphids are killed; 0% means that none of the aphids are killed.

EXAMPLE 6

Tetranychus test

Solvent: 3 parts by weight acetone
Emulsifier: 1 part by weight alkylaryl polyglycol ether.

To produce a suitable preparation of active compound, 1 part by weight of the active compound is mixed with the stated amount of solvent containing the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 6:

TABLE 6
(Tetranychus test)

| Active compounds | Concentration of active compound in percent | Degree of destruction in percent after 3 days |
|---|---|---|
| (A) $(CH_3O)_2\overset{S}{\overset{\|}{P}}$—O—[benzisoxazole-Cl] (known) | 0,1 / 0,02 | 90 / 20 |
| (1) $(C_2H_5O)_2\overset{S}{\overset{\|}{P}}$—O—[benzisoxazole-Cl] | 0,1 / 0,02 | 100 / 95 |
| (2) $(C_2H_5O)_2\overset{O}{\overset{\|}{P}}$—O—[benzisoxazole-Cl] | 0,1 / 0,02 | 100 / 98 |
| (3) $C_2H_5$, $C_2H_5O$ $\overset{S}{\overset{\|}{P}}$—O—[benzisoxazole-Cl] | 0,1 / 0,02 | 100 / 40 |

The active compounds, the amounts applied and the results can be seen from the following Table 7:

TABLE 7
(Soil insecticides)

| Active compound (constitution) | Degree of destruction in percent with a concentration of active compound in p.p.m. of— | | | | |
|---|---|---|---|---|---|
| | 40 | 20 | 10 | 5 | 2.5 |
| (1) [benzisoxazole]—O—$\overset{S}{\overset{\|}{P}}(OC_2H_5)_2$ | 100 | 100 | 100 | 100 | 75 |
| (4) [benzisoxazole]—O—$\overset{C_2H_5}{\underset{S}{\overset{\|}{P}}}$—$OC_2H_5$ | 100 | 100 | 100 | 75 | — |
| Known comparative agents: | | | | | |
| (C) Cl—[benzoxazole]—O—$\overset{O}{\overset{\|}{P}}(OC_2H_5)_2$ (known) | 0 | — | — | — | — |
| (A) Cl—[benzoxazole]—O—$\overset{S}{\overset{\|}{P}}(OCH_3)_2$ (known) | 100 | 100 | 100 | 25 | — |

EXAMPLE 7

Critical concentration test/soil insects

Test insect: cabbage root fly maggots (*Phorbia brassicae*)
Solvent: 3 parts by weight acetone
Emulsifier: 1 part by weight alkylarylpolyglycol ether.

To produce a suitable preparation of active compound, 1 part by weight of active compound is mixed with the stated amount of solvent, the stated amount of emulsifier is added and the concentrate is diluted with water to the desired concentration. The preparation of active compound is intimately mixed with soil. The concentration of the active compound in the preparation is of practically no importance; only the amount of active compound per unit volume of soil, which is given in p.p.m. (for example mg./l.), is decisive. The soil is filled into pots and the pots are left to stand at room temperature. After 24 hours, the test animals are put into the treated soil and, after a further 48 hours, the degree of effectiveness of the active compound is determined as a percentage by counting the dead and living test insects. The degree of destruction is 100% when all the test insects have been killed; it is 0% when exactly as many test insects are still alive as in the case of the control.

EXAMPLE 8

Critical concentration test

Test nematode: *Meloidogyne sp.*
Solvent: 3 parts by weight acetone
Emulsifier: 1 part by weight alkylarylpolyglycol ether.

To produce a suitable preparation of active compound, 1 part by weight of active compound is mixed with the stated amount of solvent, the stated amount of emulsifier is added and the concentrate is diluted with water to the desired concenration.

The preparation of active compound is intimately mixed with soil which is heavily infested with the test nematodes. The concentration of the active compound in the preparation is of practically no importance; only the amount of active compound per unit volume of soil, which is given in p.p.m., is decisive. The soil is filled into pots, lettuce is sown in and the pots are kept at a greenhouse temperature of 27° C. After 4 weeks, the lettuce roots are examined for infestation with nematodes, and the degree of destruction of the active compound is determined as a percentage. The degree of effectiveness is 100% when infestation is completely avoided; it is 0% when the infestation is exactly the same as in the case of the control plants in untreated soil which has been infested in the same manner.

The active compounds, the amounts applied and the results can be seen from the following Table 8:

TABLE 8
(Nematocides/Meloidogyne incognita)

| Active compound (constitution) | Degree of destruction in percent with a concentration of active compound in p.p.m. of— | | |
|---|---|---|---|
| | 40 | 20 | 10 |
| (1) [benzisoxazole with O—P(OC$_2$H$_5$)$_2$, S] | 100 | 100 | 80 |
| (C) Cl-substituted benzisoxazole with O—P(OC$_2$H$_5$)$_2$, O (known) | 0 | | |
| (A) Cl-substituted benzisoxazole with O—P(OCH$_3$)$_2$, S (known) | 0 | | |

EXAMPLE 9

LD$_{100}$ test

Test animals: *Blatta orientalis*
Solvent: acetone.

2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. 10 test animals are then placed in the Petri dish and it is covered with a glass lid.

The condition of the test animals is observed 3 days after the commencement of the experiments. The destruction is determined as a percentage.

The active compounds, the concentrations of the active compounds, the test animals and the results can be seen from the following Table 9:

TABLE 9
(LD$_{100}$ test)

| Active compounds | Concentration of active compound in percent | Destruction in percent |
|---|---|---|
| (A) Cl-substituted benzisoxazole with O—P(OCH$_3$)$_2$, S (known) | 0.2 | 0 |
| (2) benzisoxazole with O—P(OCH$_3$)$_2$, S | 0.2 | 100 |
| | 0.02 | 100 |

EXAMPLE 10

Mosquito larvae test

Test insects: *Aedes aegypti* (5th larval stage)
Solvent: 99 parts by weight acetone
Emulsifier: 1 part by weight benzylhydroxydiphenyl polyglycol ether.

To produce a suitable preparation of active compound, 2 parts by weight of the active compound are dissolved in 1000 parts by volume of the solvent containing the amount of emulsifier stated above. The solution thus obtained is diluted with water to the desired lower concentrations.

The aqueous preparations of the active compounds are placed in glass vessels and about 25 mosquito larvae are then placed in each glass vessel.

After 24 hours, the degree of destruction is determined as a percentage. 100% means that all the larvae are killed. 0% means that no larvae at all are killed.

The active compounds, the concentrations of the active compounds, the test insects and the results can be seen from Table 10:

TABLE 10
(Mosquito larvae test)

| Active compound | Concentration of active compound in the solution in percent | Degree of destruction in percent |
|---|---|---|
| (A) Cl-substituted benzisoxazole with O—P(OCH$_3$)$_2$, S (known) | 0.001 | 100 |
| | 0.0001 | 100 |
| | 0.00001 | 90 |
| (2) benzisoxazole with O—P(OCH$_3$)$_2$, S | 0.001 | 100 |
| | 0.0001 | 100 |
| | 0.00001 | 100 |
| | 0.000001 | 90 |

EXAMPLE 11

LD$_{100}$ test

Test insects: *Sitophilus granarius* (granary weevils)
Solvent: acetone.

2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used.

About 25 test insects are then placed in the Petri dish and it is covered with a glass lid.

The condition of the test insects is observed 3 days after the commencement of the experiments. The destruction is determined as a percentage.

The active compounds, the concentrations of the active compounds, the test insects and the results can be seen from Table 11:

TABLE 11
(LD₁₀₀ test)

| Active compounds | Concentration of active compound in percent | Destruction in percent |
|---|---|---|
| (A) 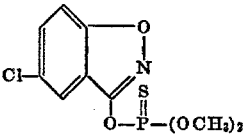 (known) | 0.2<br>0.02<br>0.002 | 100<br>00<br>0 |
| (B) 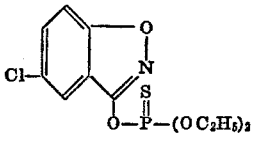 (known) | 0.2<br>0.02<br>0.002<br>0.0002 | 100<br>100<br>100<br>0 |
| (2) 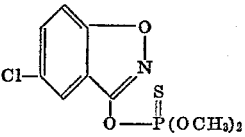 | 0.2<br>0.02<br>0.002<br>0.0002<br>0.00002 | 100<br>100<br>100<br>100<br>30 |

EXAMPLE 12

LT₁₀₀ test for Diptera

Test animals: *Aedes aegypti*
Solvent: acetone.

2 parts by weight of active compound are dissolved in 1000 parts by volume of solvent. The solution so obtained is diluted with further solvent to the desired concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test animals are then placed in the Petri dish and it is covered with a glass lid.

The condition of the test animals is periodically observed. The time which is necessary for a 100% destruction is determined.

The test animals, the active compounds, the concentrations of the active compounds and the periods of time at which there is a 100% destruction can be seen from the following Table 12:

TABLE 12
(LT₁₀₀ test for Diptera)

| Active compounds | Concentration of active compound in the solution in percent | LT₁₀₀ |
|---|---|---|
| (A) 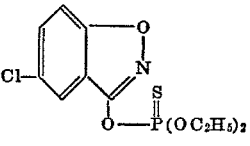 (known) | 0.2<br>0.02 | 120'<br>180' |
| (B) 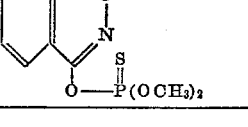 (known) | 0.2<br>0.02 | 60'<br>120' |
| (2) 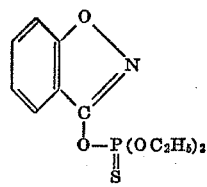 | 0.2<br>0.02<br>0.002<br>0.0002 | 60'<br>60'<br>120'<br>180' |

The preparative process of the present invention is illustrated in and by the following Example.

EXAMPLE 13

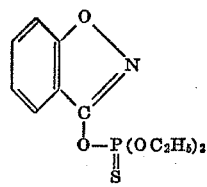
(1)

45 g. of potassium carbonate are added to a solution of 0.3 mole (41 g.) of 3-hydroxy-1,3-benzisoxazole in 250 ml. of acetonitrile; 75 g. of O,O-diethylthionophosphoric acid diester chloride are then added to 30-35° C. and heating to 70-80° C. is effected for a further 2 hours. After cooling, the mixture is taken up in benzene, extracted with water, the benzene phase is separated, dried, evaporated, and the residue is slightly distilled.

The yield is 68 g.=76% of the theory.

$n_D^{23} = 1.5238$.

Calc. for $C_{11}H_{14}O_4NSP$ (molecular weight 287): 10.8%, 11.2%, 4.88%. Found: 10.72%, 11.89%, 4.38%.

The following compounds are prepared by processes analogous to that given above:

| Formula | Refractive index |
|---|---|
| (3) 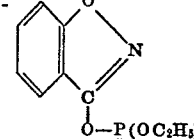 | $n_D^{23}=1.4918$ |
| (2) 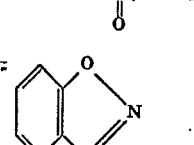 | $n_D^{23}=1.5496$ |
| (4) 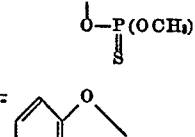 | $n_D^{23}=1.5458$ |

Preparation of the starting material

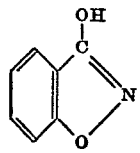

(II)

may be effected by a process analogous to that described in German Published Specification 1,157,231.

It will be appreciated that the instant specification and examples are set forth by way of illustration and not limitation, and that various modifications and changes may be made without departing from the spirit and scope of the present invention.

What is claimed is:

1. O,O - dimethyl - O - benzisoxazol(3)-yl-thionophosphoric acid ester of the formula

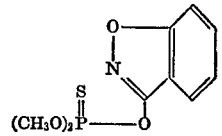  (2)

2. O,P - diethyl - O - benzisoxazol(3)-yl-thionophosphonic acid ester of the formula

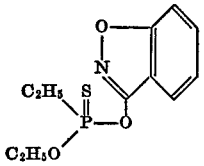  (4)

References Cited
FOREIGN PATENTS
965,997   8/1964   England.

DONALD G. DAVIS, Primary Examiner
R. V. RUSH, Assistant Examiner

U.S. Cl. X.R.
424—200

UNITED STATES PATENT OFFICE
CERTIFICATE OF CORRECTION

Patent No. 3,828,063      Dated August 6, 1974

Inventor(s) Walter Lorenz et al.

It is certified that error appears in the above-identified patent and that said Letters Patent are hereby corrected as shown below:

Col. 10, line 12-Table 5, heading of last column of Table, cancel "3 days" and substitute -- 4 days --.

Col. 11, line 19-Table 6, heading of last column of Table, cancel "3 days" and substitute -- 2 days --.

Col. 11, Table 6, Compounds (1), (2) and (3), cancel "Cl"

at the end of each formula.

Col. 16, line 67, cancel "to" and substitute -- at --.

Signed and Sealed this twenty-third Day of March 1976

[SEAL]

Attest:

RUTH C. MASON
*Attesting Officer*

C. MARSHALL DANN
*Commissioner of Patents and Trademarks*